(12) United States Patent
Ding (10) Patent No.: US 11,813,754 B2
(45) Date of Patent: Nov. 14, 2023

(54) GRABBING METHOD AND DEVICE FOR INDUSTRIAL ROBOT, COMPUTER STORAGE MEDIUM, AND INDUSTRIAL ROBOT

(71) Applicant: Robert Bosch GmbH, Stuttgart (DE)

(72) Inventor: Wan Ding, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 17/356,892

(22) Filed: Jun. 24, 2021

(65) Prior Publication Data
US 2021/0402604 A1 Dec. 30, 2021

(30) Foreign Application Priority Data

Jun. 30, 2020 (CN) .......................... 202010610965.8

(51) Int. Cl.
*B25J 9/16* (2006.01)
*B25J 9/12* (2006.01)
*B25J 9/02* (2006.01)

(52) U.S. Cl.
CPC .............. *B25J 9/1666* (2013.01); *B25J 9/02* (2013.01); *B25J 9/12* (2013.01)

(58) Field of Classification Search
CPC ..... B25J 9/02; B25J 9/12; B25J 9/1602; B25J 9/1612; B25J 9/1664; B25J 9/1666; G05B 2219/40476; G05B 2219/40371; G05B 2219/40053
See application file for complete search history.

(56) References Cited

U.S. PATENT DOCUMENTS

| | | | | |
|---|---|---|---|---|
| 11,331,799 | B1* | 5/2022 | Shafer | B25J 9/1664 |
| 2011/0035087 | A1* | 2/2011 | Kim | G05D 1/0217 |
| | | | | 701/25 |
| 2017/0323456 | A1* | 11/2017 | Matsuura | G01B 11/002 |
| 2020/0030979 | A1* | 1/2020 | Bank | B25J 13/08 |
| 2020/0171653 | A1* | 6/2020 | Holson | G05D 1/0246 |
| 2021/0252707 | A1* | 8/2021 | Wang | B25J 9/1697 |
| 2021/0278857 | A1* | 9/2021 | Wei | B25J 19/021 |
| 2022/0253039 | A1* | 8/2022 | Ayade | G05B 19/40938 |

* cited by examiner

*Primary Examiner* — Dale Moyer
(74) *Attorney, Agent, or Firm* — Maginot, Moore & Beck LLP (57) ABSTRACT

A grabbing method for an industrial robot is disclosed. The method includes obtaining an object information file. The object information file includes numbers and/or positions of detected objects. The method further includes determining collision boundary lines and collision representative objects according to the object information file. In addition, the method includes determining a collision-free grabbing path of a gripper of the industrial robot based on the determined collision boundary lines and the collision representative objects. The collision-free grabbing path is a linear path that satisfies joint limits of the industrial robot. The disclosure further relates to a grabbing device for an industrial robot, a computer storage medium, and an industrial robot.

11 Claims, 3 Drawing Sheets

GRABBING METHOD AND DEVICE FOR INDUSTRIAL ROBOT, COMPUTER STORAGE MEDIUM, AND INDUSTRIAL ROBOT

This application claims priority under 35 U.S.C. § 119 to patent application no. 202010610965.8, filed on Jun. 30, 2020 in China, the disclosure of which is incorporated herein by reference in its entirety.

The present disclosure relates to a grabbing solution for an industrial robot, and more specifically, to a grabbing method and device for an industrial robot, a computer storage medium, and an industrial robot.

BACKGROUND

In an industrial environment, it is common to use a gripper of an industrial robot to grab a two-dimensional array of objects inserted into a tray. In the prior art, a robot teaching solution is generally used to deal with the grabbing/unloading process of the objects. Due to a fixed grabbing path usually used in the robot teaching solution, the existing solution cannot deal with at least the following uncertainties: (1) the uncertainty of a small-range offset of positions of the tray and the objects; (2) the number of objects inserted into the tray (that is, there may or may not be an object in the two-dimensional array); and (3) reachability restrictions of joints of the robot.

Therefore, an improved grabbing solution for an industrial robot is desired.

SUMMARY

According to an aspect of the present disclosure, a grabbing method for an industrial robot is provided, the method comprising: obtaining an object information file, wherein the object information file comprises numbers and/or positions of detected objects; determining collision boundary lines and collision representative objects according to the object information file; and determining a collision-free grabbing path of a gripper of the industrial robot based on the determined collision boundary lines and the collision representative objects, wherein the collision-free grabbing path is a linear path that satisfies joint limits of the industrial robot.

As a supplement or an alternative to the above solution, in the above method, the collision-free grabbing path is formed by connecting an initial position point, an approaching position point, and a grabbing position point of the gripper.

As a supplement or an alternative to the above solution, the above method may further comprise: before the collision boundary lines and the collision representative objects are determined, setting an initial posture of the gripper.

As a supplement or an alternative to the above solution, in the above method, the determining collision boundary lines and collision representative objects according to the object information file comprises: for a currently grabbed object, detecting a first object and a second object, with a connecting line between the first object and the currently grabbed object and a connecting line between the second object and the currently grabbed object forming the largest included angle; determining the connecting line between the first object and the currently grabbed object and the connecting line between the second object and the currently grabbed object as the collision boundary lines; and determining the first object and the second object as the collision representative objects.

As a supplement or an alternative to the above solution, in the above method, the currently grabbed object is determined based on the shortest distance between one or more objects to be grabbed and a coordinate system of the industrial robot.

As a supplement or an alternative to the above solution, in the above method, the determining a collision-free grabbing path of a gripper of the industrial robot based on the determined collision boundary lines and the collision representative objects comprises: generating, based on the collision boundary lines, a gripper sampling set containing a plurality of grabbing postures and generating a traversal sampling sequence; selecting a first grabbing posture from the gripper sampling set based on the traversal sampling sequence; and determining, using the collision representative objects, that the first grabbing posture does not incur collision.

As a supplement or an alternative to the above solution, in the above method, the determining a collision-free grabbing path of a gripper of the industrial robot based on the determined collision boundary lines and the collision representative objects further comprises: determining a first approaching posture based on the first grabbing posture, wherein a degree-of-freedom pose of the gripper at a first approaching point is the same as a degree-of-freedom pose of the gripper at a first grabbing point, but the position of the first approaching point is different from that of the first grabbing point.

As a supplement or an alternative to the above solution, in the above method, the determining a collision-free grabbing path of a gripper of the industrial robot based on the determined collision boundary lines and the collision representative objects further comprises: detecting reachability of the first grabbing posture and the first approaching posture by means of inverse kinematics calculation; and checking joint value continuity of the initial posture, the first approaching posture, and the first grabbing posture.

According to another aspect of the present disclosure, a grabbing device for an industrial robot is provided, the device comprising: an obtaining apparatus configured to obtain an object information file, wherein the object information file comprises numbers and/or positions of detected objects; a first determination apparatus configured to determine collision boundary lines and collision representative objects according to the object information file; and a second determination apparatus configured to determine a collision-free grabbing path of a gripper of the industrial robot based on the determined collision boundary lines and the collision representative objects, wherein the collision-free grabbing path is a linear path that satisfies joint limits of the industrial robot.

As a supplement or an alternative to the above solution, in the above device, the collision-free grabbing path is formed by connecting an initial position point, an approaching position point, and a grabbing position point of the gripper.

As a supplement or an alternative to the above solution, the above device may further comprise: a setting apparatus configured to, before the first determination apparatus determines the collision boundary lines and the collision representative objects, set an initial posture of the gripper.

As a supplement or an alternative to the above solution, in the above device, the first determination apparatus is configured to: for a currently grabbed object, detect a first object and a second object, with a connecting line between the first object and the currently grabbed object and a connecting line between the second object and the currently grabbed object forming the largest included angle; determine the connecting line between the first object and the currently grabbed object and the connecting line between the second object and the currently grabbed object as the collision boundary lines; and determine the first object and the second object as the collision representative objects.

As a supplement or an alternative to the above solution, in the above device, the currently grabbed object is determined based on the shortest distance between one or more objects to be grabbed and a coordinate system of the industrial robot.

As a supplement or an alternative to the above solution, in the above device, the second determination apparatus is configured to: generate, based on the collision boundary lines, a gripper sampling set containing a plurality of grabbing postures and generating a traversal sampling sequence; select a first grabbing posture from the gripper sampling set based on the traversal sampling sequence; and determine, using the collision representative objects, that the first grabbing posture does not incur collision.

As a supplement or an alternative to the above solution, in the above device, the second determination apparatus is further configured to: determine a first approaching posture based on the first grabbing posture, wherein a degree-of-freedom pose of the gripper at a first approaching point is the same as a degree-of-freedom pose of the gripper at a first grabbing point, but the position of the first approaching point is different from that of the first grabbing point.

As a supplement or an alternative to the above solution, in the above device, the second determination apparatus is further configured to: detect reachability of the first grabbing posture and the first approaching posture by means of inverse kinematics calculation; and check joint value continuity of the initial posture, the first approaching posture, and the first grabbing posture.

According to still another aspect of the present disclosure, a computer storage medium is provided, wherein the medium comprises instructions, and when the instructions are executed, the grabbing method as described above is performed.

According to yet another aspect of the present disclosure, an industrial robot is provided, the industrial robot comprising the grabbing device as described above.

Compared with an existing grabbing solution, in the grabbing solution according to one or more embodiments of the present disclosure, the collision-free grabbing path of the gripper of the industrial robot is finally determined by determining the collision boundary lines and the collision representative objects. The collision-free grabbing path may be an automatically generated linear path (for example, from the initial position point through the approaching position point to the grabbing position point, and satisfies joint limits of the industrial robot.

BRIEF DESCRIPTION OF THE DRAWINGS

The above and other objects and advantages of the present disclosure will be more complete and clearer from the following detailed description in conjunction with the accompanying drawings, wherein the same or similar elements are denoted by the same reference numerals.

DETAILED DESCRIPTION

A grabbing solution for an industrial robot according to various exemplary embodiments of the present disclosure will be described below in detail with reference to the accompanying drawings.

Figure 1:
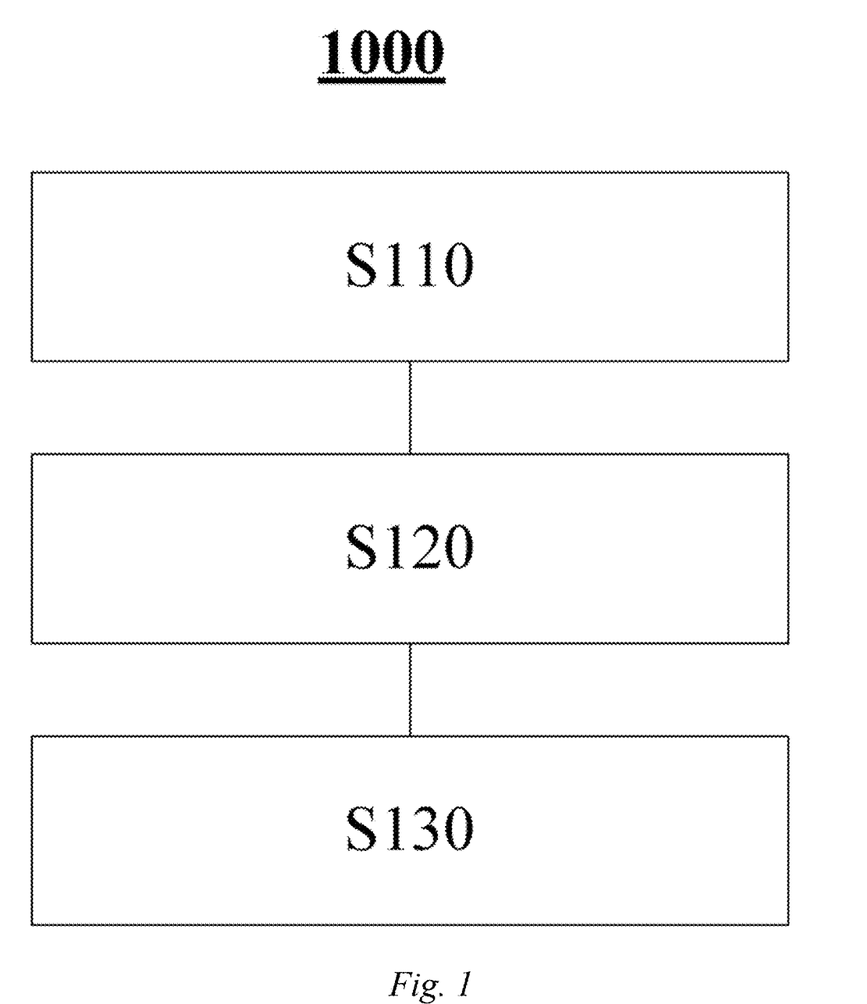
FIG. 1 is a schematic flowchart of a grabbing method for an industrial robot according to an embodiment of the present disclosure.

FIG. 1 is a schematic flowchart of a grabbing method 1000 for an industrial robot according to an embodiment of the present disclosure. As shown in FIG. 1, the method 1000 comprises the following steps:

in step S110, obtaining an object information file, wherein the object information file comprises numbers and/or positions of detected objects;

in step S120, determining collision boundary lines and collision representative objects according to the object information file; and in step S130, determining a collision-free grabbing path of a gripper of the industrial robot based on the determined collision boundary lines and the collision representative objects, wherein the collision-free grabbing path is a linear path that satisfies joint limits of the industrial robot.

In the context of the present disclosure, the term "industrial robot" refers to a multi-joint manipulator or a multi-degree-of-freedom machine or apparatus widely used in the industrial field. Industrial robots are automated to a certain extent and can rely on their own power or energy and control capability to achieve various industrial processing and manufacturing functions.

The term "object information file" refers to a file that records position information of objects inserted into a tray, and the file can be obtained using a vision-based solution. In an embodiment, the object information file comprises numbers and/or positions of detected objects. For example, positions on a two-dimensional 3*3 tray where objects can be placed are numbered in sequence. For example, "1" represents the upper-left position, "2" represents the upper-middle position, "3" represents the upper-right position, "4" represents the leftmost position of the second row in the middle, and so on. In this numbering method, if the content of the object information file is 1, 3, 4, 5, and 8, it can be determined that objects exist or are detected at five positions in total, namely, the upper-left position, the upper-right position, the leftmost position of the second row in the middle of the tray, the central position of the two-dimensional array, and the lower-middle position. Those skilled in the art can easily understand that the specific content of the object information file is not limited to the above specific example, but instead various numbering methods can be used to number the positions of the objects, and the positions of the objects can be represented in different manners (for example, in XY coordinates).

The term "collision representative objects" refers to representatives of other objects that are most likely to collide with a gripper, etc. when a particular object is being grabbed. For example, when there are a plurality of objects to be grabbed, two objects (for example, a first object and a second object) may be detected, with a connecting line between the first object and a currently grabbed object and a connecting line between the second object and the currently grabbed object forming the largest included angle, and then the first object and the second object are determined as the collision representative objects. The "collision boundary lines" can be represented by the connecting lines between the collision representative objects and the currently grabbed object.

Figure 4:
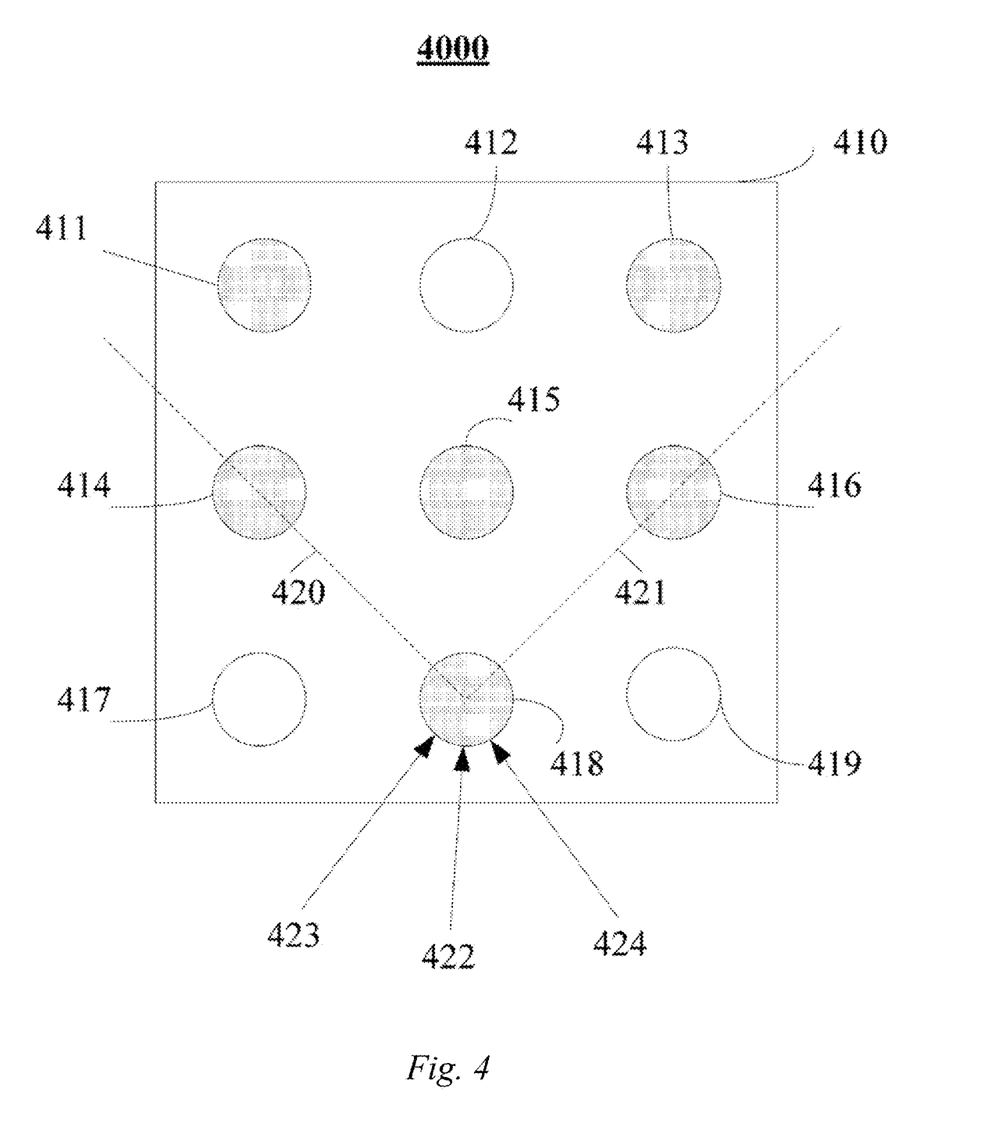
FIG. 4 schematically shows a process of grabbing, by an industrial robot, objects on a tray according to an embodiment of the present disclosure.

Referring to FIG. 4, FIG. 4 schematically shows a process of grabbing, by an industrial robot, objects on a tray according to an embodiment of the present disclosure. As shown in FIG. 4, when the industrial robot is to grab an object at a position 418, various detection manners (such as circular scanning around a current grabbing position) can be used to determine that the collision representative objects are objects at positions 414 and 416. Connecting lines 420 and 421 between the current grabbing position 418 and the positions 414 and 416, respectively, can be determined as the collision boundary lines. It can be understood that under extreme circumstances, for example, when there is only one position, other than the current grabbing position, at which an object has not yet been grabbed, the object that has not been grabbed is a collision representative object, and a connecting line between the object and the currently grabbed object is a collision boundary line.

In the context of the present disclosure, the "collision-free grabbing path" is a linear path that satisfies the joint limits of the industrial robot and can avoid collision between the gripper and an object or between objects during the grabbing process. In an embodiment, the "collision-free grabbing path" may be formed by connecting an initial position point, an approaching position point, and a grabbing position point of the gripper. In other words, after the three points, namely, the initial position point, the approaching position point, and the grabbing position point of the gripper of the industrial robot, are determined, the collision-free grabbing path is obtained accordingly.

According to the foregoing grabbing method 1000 for the industrial robot, the collision boundary lines and the collision representative objects are determined, such that the collision-free grabbing path of the gripper of the industrial robot can be finally determined. In one or more embodiments, the collision-free grabbing path may be an automatically generated linear path (for example, from the initial position point through the approaching position point to the grabbing position point), and satisfies the joint limits of the industrial robot.

Although not shown in FIG. 1, in an embodiment, the grabbing method 1000 for the industrial robot may further comprise: before the collision boundary lines and the collision representative objects are determined, setting an initial posture of the gripper.

In the context of the present disclosure, the "posture" of the gripper comprises two meanings: a position (for example, three-dimensional relative position coordinates XYZ) of the gripper and a degree-of-freedom pose (for example, an angle) of the gripper. Therefore, in the foregoing embodiment, if the initial posture of the gripper has been set, both the position and the degree-of-freedom pose of the gripper have been determined.

In an embodiment, step S120 comprises: for a currently grabbed object, detecting a first object and a second object, with a connecting line between the first object and the currently grabbed object and a connecting line between the second object and the currently grabbed object forming the largest included angle; determining the connecting line between the first object and the currently grabbed object and the connecting line between the second object and the currently grabbed object as the collision boundary lines; and determining the first object and the second object as the collision representative objects. For example, referring to FIG. 4, when the industrial robot is to grab the object at the position 418 (that is, the currently grabbed object is the object at the position 418), because the positions 414 and 416 can form the largest included angle with the position 418, the objects at the positions 414 and 416 are determined as the collision representative objects, and the connecting lines 420 and 421 between the current grabbing position 418 and the positions 414 and 416, respectively, are determined as the collision boundary lines.

It should be noted that the method of determining the collision representative objects and the collision boundary lines in the foregoing embodiment is usually applicable when the number of objects to be grabbed is greater than or equal to 3. In an embodiment, when there is only one position, other than the current grabbing position, at which an object has not yet been grabbed, the object that has not been grabbed is a collision representative object, and a connecting line between the object and the currently grabbed object is a collision boundary line. In another embodiment, under extreme circumstances where there is no other object to be grabbed other than the object at the current grabbing position, because there is no possibility of collision between objects at this time, there is no collision representative object and collision boundary line.

In addition, in one or more embodiments, the currently grabbed object may be determined based on the shortest distance between one or more objects to be grabbed and a coordinate system of the industrial robot. Referring to FIG. 4, there are objects to be grabbed at a plurality of positions on a tray 410, and they are objects at positions 411, 413, 414, 415, 416, and 418. Based on distances between the plurality of objects to be grabbed and the coordinate system of the industrial robot, it can be determined that the object at the position 418 has the shortest distance, and therefore it is determined that the currently grabbed object is the object at the position 418. After the object at the position 418 has been grabbed, the above step may be performed again, that is, a subsequently grabbed object is determined based on the shortest distance between the remaining objects to be grabbed and the coordinate system of the industrial robot.

In an embodiment, step S130 comprises: generating, based on the collision boundary lines, a gripper sampling set containing a plurality of grabbing postures and generating a traversal sampling sequence; selecting a first grabbing posture from the gripper sampling set based on the traversal sampling sequence; and determining, using the collision representative objects, that the first grabbing posture does not incur collision.

Referring to FIG. 4 again, after the collision boundary lines 420 and 421 have been determined, a gripper sampling set may be generated. For example, the gripper sampling set comprises a plurality of grabbing postures 422, 423, and 424 (the grabbing directions of the plurality of grabbing postures 422, 423, and 424 are all parallel to the plane of the tray 410, with different grabbing angles). Various methods can be used to generate the gripper sampling set. In an embodiment, first, the first grabbing posture 422 may be determined based on the angle bisector of the included angle formed by the collision boundary lines, and then the second grabbing posture 423 and the third grabbing posture 424 may be determined, wherein a grabbing angle of the second grabbing posture 423 differs from that of the first grabbing posture 422 by a first preset value, and a grabbing angle of the third grabbing posture 424 differs from that of the first grabbing gesture 422 by a second preset value. Those skilled in the art can understand that more grabbing postures (grabbing angles) may be comprised in the gripper sampling set, depending on actual situations.

Moreover, priorities of the grabbing postures may be further set in the gripper sampling set. For example, in the embodiment of FIG. 4, the grabbing posture 422 with the grabbing angle parallel to the angle bisector may be set to the highest priority, followed by the grabbing posture 423 and then the grabbing posture 424. Therefore, collision detection and inverse kinematics calculation, etc. can be performed by means of traversal based on the priorities of the grabbing postures, which helps quickly obtain the collision-free grabbing path of the gripper. For example, the grabbing posture 422 and the collision representative objects 414 and 416 are first used to determine whether collision will occur in the grabbing process. If yes, the other postures (423 and 424) are selected for verification in sequence according to the preset priorities. If no, the collision-free grabbing path of the gripper may be further determined based on the grabbing posture.

In an embodiment, step S130 further comprises: determining a first approaching posture based on the first grabbing posture, wherein a degree-of-freedom pose of the gripper at a first approaching point is the same as a degree-of-freedom pose of the gripper at a first grabbing point, but the position of the first approaching point is different from that of the first grabbing point. Various methods can be used to determine the first approaching posture based on the first grabbing posture. It can be seen that the first approaching posture and the first grabbing posture have the same degree-of-freedom pose (that is, the same angle), and differ only in the spatial relative position. Therefore, for example, a distance between spatial positions of the first grabbing posture and the first approaching posture may be determined according to an empirical value.

In an embodiment, step S130 may further comprise: detecting reachability of the first grabbing posture and the first approaching posture by means of inverse kinematics calculation; and checking joint value continuity of the initial posture, the first approaching posture, and the first grabbing posture. Specifically, a first joint value may be first solved for by means of inverse kinematics calculation at the first grabbing posture (the position of the first grabbing point), and it is determined whether the grabbing posture is beyond the joint limits of the robot. If no, a second joint value may be then solved for by means of inverse kinematics calculation at the first approaching posture (the position of the first approaching point), and at the same time it is determined whether the approaching posture is beyond the joint limits of the robot. Then the continuity of the postures (that is, the joint value continuity) and the reachability of the linear path may be verified based on the determined initial posture, approaching posture, and grabbing posture. Finally, postures (including joint angle values of the robot) at various passing points may be output. With the foregoing method, the collision-free grabbing path (from the initial posture through the approaching posture to the grabbing posture) of the robot has passed the inverse kinematics verification and the collision-free check, thereby avoiding collision while ensuring that the joint limits of the industrial robot are satisfied.

Figure 2:
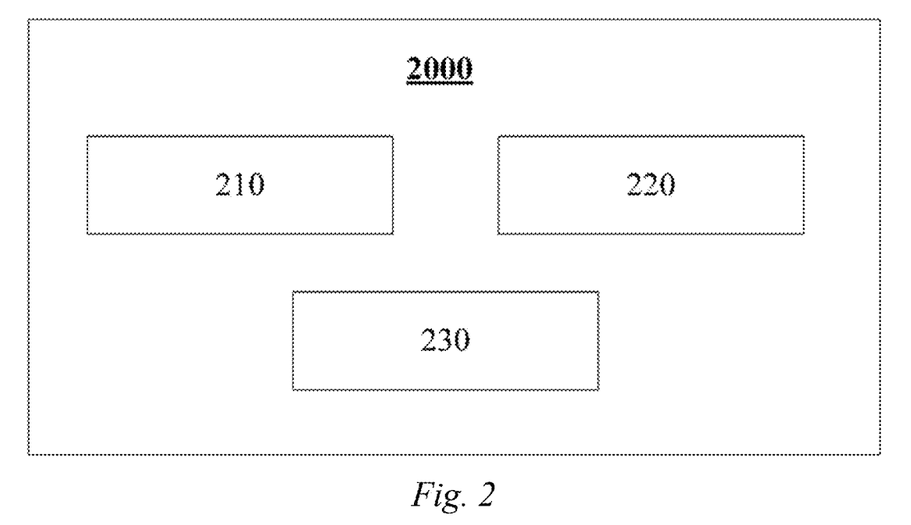
FIG. 2 is a schematic structural diagram of a grabbing device for an industrial robot according to an embodiment of the present disclosure.

Referring to FIG. 2, FIG. 2 is a schematic structural diagram of a grabbing device 2000 for an industrial robot according to an embodiment of the present disclosure. As shown in FIG. 2, the grabbing device 2000 comprises an obtaining apparatus 210, a first determination apparatus 220, and a second determination apparatus 230. The obtaining device 210 is configured to obtain an object information file, wherein the object information file comprises numbers and/or positions of detected objects; the first determination apparatus 220 is configured to determine collision boundary lines and collision representative objects according to the object information file; and the second determination apparatus 230 is configured to determine a collision-free grabbing path of a gripper of the industrial robot based on the determined collision boundary lines and the collision representative objects, wherein the collision-free grabbing path is a linear path that satisfies joint limits of the industrial robot.

In the context of the present disclosure, the term "industrial robot" refers to a multi-joint manipulator or a multi-degree-of-freedom machine or apparatus widely used in the industrial field. Industrial robots are automated to a certain extent and can rely on their own power or energy and control capability to achieve various industrial processing and manufacturing functions.

The term "object information file" refers to a file that records position information of objects inserted into a tray, and the file can be obtained using a vision-based solution. In an embodiment, the object information file comprises numbers and/or positions of detected objects. For example, positions on a two-dimensional 3*3 tray where objects can be placed are numbered in sequence. For example, "1" represents the upper-left position, "2" represents the upper-middle position, "3" represents the upper-right position, "4" represents the leftmost position of the second row in the middle, and so on. In this numbering method, if the content of the object information file is 1, 3, 4, 5, and 8, it can be determined that objects exist or are detected at five positions in total, namely, the upper-left position, the upper-right position, the leftmost position of the second row in the middle of the tray, the central position of the two-dimensional array, and the lower-middle position. Those skilled in the art can easily understand that the specific content of the object information file is not limited to the above specific example, but instead various numbering methods can be used to number the positions of the objects, and the positions of the objects can be represented in different manners (for example, in XY coordinates).

The term "collision representative objects" refers to representatives of other objects that are most likely to collide with a gripper, etc. when a particular object is being grabbed. For example, when there are a plurality of objects to be grabbed, two objects (for example, a first object and a second object) may be detected, with a connecting line between the first object and a currently grabbed object and a connecting line between the second object and the currently grabbed object forming the largest included angle, and then the first object and the second object are determined as the collision representative objects. The "collision boundary lines" can be represented by the connecting lines between the collision representative objects and the currently grabbed object.

Referring to FIG. 4, FIG. 4 schematically shows a process of grabbing, by an industrial robot, objects on a tray according to an embodiment of the present disclosure. As shown in FIG. 4, when the industrial robot is to grab an object at a position 418, various detection manners (such as circular scanning around a current grabbing position) can be used to determine that the collision representative objects are objects at positions 414 and 416. Connecting lines 420 and 421 between the current grabbing position 418 and the positions 414 and 416, respectively, can be determined as the collision boundary lines. It can be understood that under extreme circumstances, for example, when there is only one position, other than the current grabbing position, at which an object has not yet been grabbed, the object that has not been grabbed is a collision representative object, and a connecting line between the object and the currently grabbed object is a collision boundary line.

In the context of the present disclosure, the "collision-free grabbing path" is a linear path that satisfies the joint limits of the industrial robot and can avoid collision between the gripper and an object or between objects during the grabbing process. In an embodiment, the "collision-free grabbing path" may be formed by connecting an initial position point, an approaching position point, and a grabbing position point of the gripper. In other words, after the three points, namely, the initial position point, the approaching position point, and the grabbing position point of the gripper of the industrial robot, are determined, the collision-free grabbing path is obtained accordingly.

According to the foregoing grabbing device 2000 for the industrial robot, the first determination apparatus 220 determines the collision boundary lines and the collision representative objects, such that the second determination apparatus 230 can finally determine the collision-free grabbing path of the gripper of the industrial robot. In one or more embodiments, the collision-free grabbing path may be an automatically generated linear path (for example, from the initial position point through the approaching position point to the grabbing position point), and satisfies the joint limits of the industrial robot.

Although not shown in FIG. 2, in an embodiment, the grabbing device 2000 for the industrial robot may further comprise: a setting apparatus configured to, before the first determination apparatus determines the collision boundary lines and the collision representative objects, set an initial posture of the gripper.

In the context of the present disclosure, the "posture" of the gripper comprises two meanings: a position (for example, three-dimensional relative position coordinates XYZ) of the gripper and a degree-of-freedom pose (for example, an angle) of the gripper. Therefore, in the foregoing embodiment, if the initial posture of the gripper has been set, both the position and the degree-of-freedom pose of the gripper have been determined.

In an embodiment, the first determination apparatus 220 is configured to: for a currently grabbed object, detect a first object and a second object, with a connecting line between the first object and the currently grabbed object and a connecting line between the second object and the currently grabbed object forming the largest included angle; determine the connecting line between the first object and the currently grabbed object and the connecting line between the second object and the currently grabbed object as the collision boundary lines; and determine the first object and the second object as the collision representative objects. For example, referring to FIG. 4, when the industrial robot is to grab the object at the position 418 (that is, the currently grabbed object is the object at the position 418), because the positions 414 and 416 can form the largest included angle with the position 418, the objects at the positions 414 and 416 are determined as the collision representative objects, and the connecting lines 420 and 421 between the current grabbing position 418 and the positions 414 and 416, respectively, are determined as the collision boundary lines.

It should be noted that the method of determining, by the first determination apparatus 220, the collision representative objects and the collision boundary lines in the foregoing embodiment is usually applicable when the number of objects to be grabbed is greater than or equal to 3. In an embodiment, when there is only one position, other than the current grabbing position, at which an object has not yet been grabbed, the object that has not been grabbed is a collision representative object, and a connecting line between the object and the currently grabbed object is a collision boundary line. In another embodiment, under extreme circumstances where there is no other object to be grabbed other than the object at the current grabbing position, because there is no possibility of collision between objects at this time, there is no collision representative object and collision boundary line.

In addition, in one or more embodiments, the currently grabbed object may be determined based on the shortest distance between one or more objects to be grabbed and a coordinate system of the industrial robot. Referring to FIG. 4, there are objects to be grabbed at a plurality of positions on a tray 410, and they are objects at positions 411, 413, 414, 415, 416, and 418. Based on distances between the plurality of objects to be grabbed and the coordinate system of the industrial robot, it can be determined that the object at the position 418 has the shortest distance, and therefore it is determined that the currently grabbed object is the object at the position 418. After the object at the position 418 has been grabbed, the above step may be performed again, that is, a subsequently grabbed object is determined based on the shortest distance between the remaining objects to be grabbed and the coordinate system of the industrial robot.

In an embodiment, the second determination apparatus 230 is configured to: generate, based on the collision boundary lines, a gripper sampling set containing a plurality of grabbing postures and generating a traversal sampling sequence; select a first grabbing posture from the gripper sampling set based on the traversal sampling sequence; and determine, using the collision representative objects, that the first grabbing posture does not incur collision.

Referring to FIG. 4 again, after the collision boundary lines 420 and 421 have been determined, a gripper sampling set may be generated. For example, the gripper sampling set comprises a plurality of grabbing postures 422, 423, and 424 (the grabbing directions of the plurality of grabbing postures 422, 423, and 424 are all parallel to the plane of the tray 410, with different grabbing angles). Various methods can be used to generate the gripper sampling set. In an embodiment, first, the first grabbing posture 422 may be determined based on the angle bisector of the included angle formed by the collision boundary lines, and then the second grabbing posture 423 and the third grabbing posture 424 may be determined, wherein a grabbing angle of the second grabbing posture 423 differs from that of the first grabbing posture 422 by a first preset value, and a grabbing angle of the third grabbing posture 424 differs from that of the first grabbing gesture 422 by a second preset value. Those skilled in the art can understand that more grabbing postures (grabbing angles) may be comprised in the gripper sampling set, depending on actual situations.

Moreover, priorities of the grabbing postures may be further set in the gripper sampling set. For example, in the embodiment of FIG. 4, the grabbing posture 422 with the grabbing angle parallel to the angle bisector may be set to the highest priority, followed by the grabbing posture 423 and the grabbing posture 424. Therefore, collision detection and inverse kinematics calculation, etc. can be performed by means of traversal based on the priorities of the grabbing postures, which helps quickly obtain the collision-free grabbing path of the gripper. For example, the grabbing posture 422 and the collision representative objects 414 and 416 are first used to determine whether collision will occur in the grabbing process. If yes, the other postures (423 and 424) are selected for verification in sequence according to the preset priorities. If no, the collision-free grabbing path of the gripper may be further determined based on the grabbing posture.

In an embodiment, the second determination apparatus 230 is further configured to: determine a first approaching posture based on the first grabbing posture, wherein a degree-of-freedom pose of the gripper at a first approaching point is the same as a degree-of-freedom pose of the gripper at a first grabbing point, but the position of the first approaching point is different from that of the first grabbing point. Various methods can be used to determine the first approaching posture based on the first grabbing posture. It can be seen that the first approaching posture and the first grabbing posture have the same degree-of-freedom pose (that is, the same angle), and differ only in the spatial relative position. Therefore, for example, a distance between spatial positions of the first grabbing posture and the first approaching posture may be determined according to an empirical value.

In an embodiment, the second determination apparatus 230 is further configured to: detect reachability of the first grabbing posture and the first approaching posture by means of inverse kinematics calculation; and check joint value continuity of the initial posture, the first approaching posture, and the first grabbing posture. Specifically, a first joint value may be first solved for by means of inverse kinematics calculation at the first grabbing posture (the position of the first grabbing point), and it is determined whether the grabbing posture is beyond the joint limits of the robot. If no, a second joint value may be then solved for by means of inverse kinematics calculation at the first approaching posture (the position of the first approaching point), and at the same time it is determined whether the approaching posture is beyond the joint limits of the robot. Then the continuity of the postures (that is, the joint value continuity) and the reachability of the linear path may be verified based on the determined initial posture, approaching posture, and grabbing posture. Finally, postures (including joint angle values of the robot) at various passing points may be output. With the foregoing method, the collision-free grabbing path (from the initial posture through the approaching posture to the grabbing posture) of the robot has passed the inverse kinematics verification and the collision-free check, thereby avoiding collision while ensuring that the joint limits of the industrial robot are satisfied.

Those skilled in the art can easily understand that the grabbing method for an industrial robot provided in one or more embodiments of the present disclosure can be implemented by means of a computer program. For example, when a computer storage medium (such as a USB flash drive) storing the computer program is connected to a computer, the grabbing method in the embodiments of the present disclosure can be performed by executing the computer program.

Figure 3:
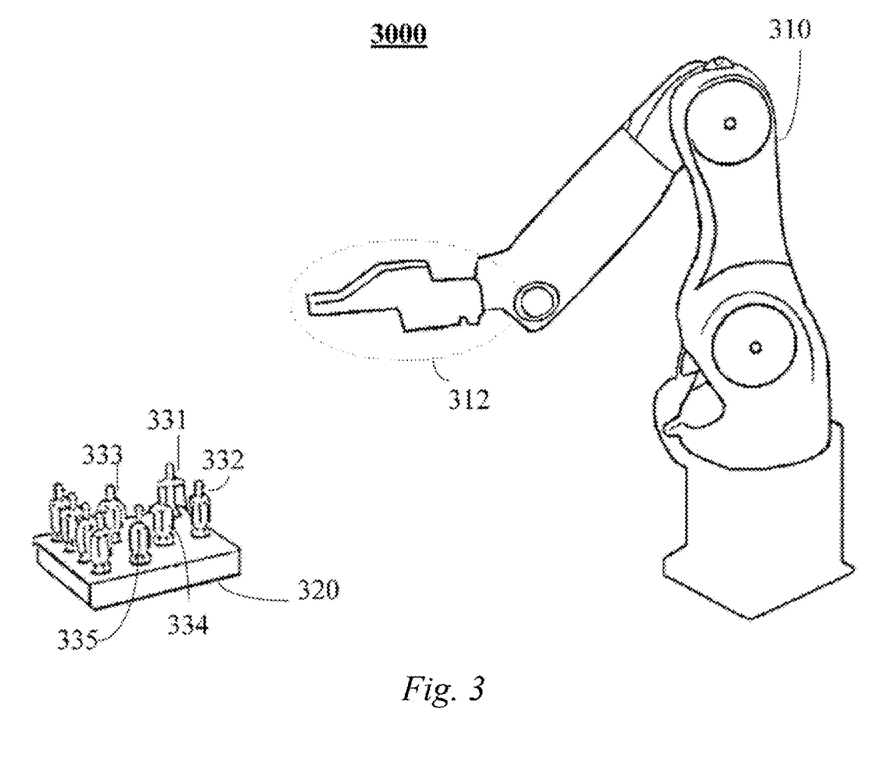
FIG. 3 is a diagram of a scenario of an operation of an industrial robot according to an embodiment of the present disclosure.

FIG. 3 is a diagram 3000 of a scenario of an operation of an industrial robot according to an embodiment of the present disclosure. In FIG. 3, an industrial robot 310 has a gripper 312, and one or more objects 331, 332, 333, 334, and 335 to be grabbed are on a tray 320. It should be noted that in FIG. 3, the tray 320 is shown as a square in a 4*4 array, but its shape is not limited thereto. For example, the tray 320 may be a square or circle in any N*N array. In addition, those skilled in the art can also understand that the industrial robot 310 shown in FIG. 3 is also schematic. In fact, the present disclosure does not specifically limit shapes or the number of joints of the industrial robot.

FIG. 4 schematically shows a process of grabbing, by an industrial robot, objects on a tray according to an embodiment of the present disclosure. As shown in FIG. 4, a tray 410 is a two-dimensional 3*3 array, in which there are objects to be grabbed at positions 411, 413, 414, 415, 416, and 418, and there are no objects at the remaining positions 412, 417, and 419. In an embodiment, first, a scenario file is configured, so as to prepare for subsequent detection of collision between the objects and the robot. Next, a currently grabbed object (for example, an object at the position 418) is selected, and an initial posture of the gripper is set. Subsequently, an object information file is read, wherein the object information file comprises object numbers and/or positions (for example, 411, 413, 414, 415, 416, and 418) calculated or detected by using a computer vision algorithm. Next, according to the object information file, collision representative objects (414 and 416) are selected along detected collision boundary lines (for example, 420 and 421). Then, a gripper sampling set (422, 423, and 424) is set and a traversal sampling sequence is generated. For example, a first approaching posture is first calculated along the direction of the first grabbing posture 422, and the joint reachability, continuity, and whether collision will occur, etc. are checked. If the first grabbing posture 422 has problems concerning the joint reachability or collision, etc., the other grabbing postures 423 and 424 may be used to repeat the check and determination according to the traversal sampling sequence. Specifically, the check and determination may comprise: (1) completing the collision check on the collision representative objects; (2) solving for a joint value according to inverse kinematics calculation at a grabbing posture and determining whether the grabbing posture satisfies the joint limits; (3) solving for a joint value according to the inverse kinematics calculation at an approaching posture and determining whether the approaching posture satisfies the joint limits; and (4) checking the reachability of the linear path and posture continuity between the initial posture, the approaching posture, and the grabbing posture. Finally, postures at passing points and joint angles of the passing points are output.

In conclusion, according to the grabbing solution for the industrial robot, the collision boundary lines and the collision representative objects are determined, such that the collision-free grabbing path of the gripper of the industrial robot is finally determined. The collision-free grabbing path may be an automatically generated linear path (for example, from the initial position point through the approaching position point to the grabbing position point), and satisfies joint limits of the industrial robot.

The above examples mainly illustrate the grabbing solution for the industrial robot of the present disclosure. Although only some of the implementations of the present disclosure have been described, those of ordinary skill in the art should understand that the present disclosure can be implemented in many other forms without departing from its spirit and scope. Therefore, the presented examples and implementations are considered to be schematic rather than restrictive, and without departing from the spirit and scope of the present disclosure that are defined by the appended claims, the present disclosure may cover various changes and replacements.

What is claimed is:

1. A grabbing method for an industrial robot, comprising:
obtaining an object information file, wherein the object information file comprises numbers and/or positions of detected objects;
determining collision boundary lines and collision representative objects according to the object information file;
determining a collision-free grabbing path of a gripper of the industrial robot based on the determined collision boundary lines and the collision representative objects, wherein the collision-free grabbing path is a linear path that satisfies joint limits of the industrial robot, wherein the collision-free grabbing path is formed by connecting an initial position point, an approaching position point, and a grabbing position point of the gripper; and
before the collision boundary lines and the collision representative objects are determined, setting an initial posture of the gripper,
wherein, when there are a plurality of objects to be grabbed at different positions, the determining collision boundary lines and collision representative objects according to the object information file comprises:
for a currently grabbed object, detecting a first object of the plurality of objects and a second object of the plurality of objects, with a connecting line between the first object and the currently grabbed object and a connecting line between the second object and the currently grabbed object forming the largest included angle;
determining the connecting line between the first object and the currently grabbed object and the connecting line between the second object and the currently grabbed object as the collision boundary lines; and
determining the first object and the second object as the collision representative objects.

2. The method of claim 1, wherein the currently grabbed object is determined based on the shortest distance between one or more objects to be grabbed of the plurality of objects and a coordinate system of the industrial robot.

3. The method of claim 1, wherein the determining a collision-free grabbing path of a gripper of the industrial robot based on the determined collision boundary lines and the collision representative objects comprises:
generating, based on the collision boundary lines, a gripper sampling set containing a plurality of grabbing postures and generating a traversal sampling sequence;
selecting a first grabbing posture from the gripper sampling set based on the traversal sampling sequence; and
determining, using the collision representative objects, that the first grabbing posture does not incur collision.

4. The method of claim 3, wherein the determining a collision-free grabbing path of a gripper of the industrial robot based on the determined collision boundary lines and the collision representative objects further comprises:
determining a first approaching posture based on the first grabbing posture, wherein a degree-of-freedom pose of the gripper at a first approaching point is the same as a degree-of-freedom pose of the gripper at a first grabbing point, but the position of the first approaching point is different from that of the first grabbing point.

5. The method of claim 4, wherein the determining a collision-free grabbing path of a gripper of the industrial robot based on the determined collision boundary lines and the collision representative objects further comprises:
detecting reachability of the first grabbing posture and the first approaching posture by way of inverse kinematics calculation; and
checking joint value continuity of the initial posture, the first approaching posture, and the first grabbing posture.

6. A grabbing device for an industrial robot, comprising:
an obtaining apparatus configured to obtain an object information file, wherein the object information file comprises numbers and/or positions of detected objects;
a first determination apparatus configured to determine collision boundary lines and collision representative objects according to the object information file;
a second determination apparatus configured to determine a collision-free grabbing path of a gripper of the industrial robot based on the determined collision boundary lines and the collision representative objects, wherein the collision-free grabbing path is a linear path that satisfies joint limits of the industrial robot, wherein the collision-free grabbing path is formed by connecting an initial position point, an approaching position point, and a grabbing position point of the gripper; and
a setting apparatus configured to, before the first determination apparatus determines the collision boundary lines and the collision representative objects, set an initial posture of the gripper,
wherein, when there are a plurality of objects to be grabbed at different positions, the first determination apparatus is configured to:
for a currently grabbed object, detect a first object of the plurality of objects and a second object of the plurality of objects, with a connecting line between the first object and the currently grabbed object and a connecting line between the second object and the currently grabbed object forming the largest included angle;
determine the connecting line between the first object and the currently grabbed object and the connecting line between the second object and the currently grabbed object as the collision boundary lines; and
determine the first object and the second object as the collision representative objects.

7. The device of claim 6, wherein the currently grabbed object is determined based on the shortest distance between one or more objects to be grabbed of the plurality of objects and a coordinate system of the industrial robot.

8. The device of claim 6, wherein the second determination apparatus is configured to:
generate, based on the collision boundary lines, a gripper sampling set containing a plurality of grabbing postures and generating a traversal sampling sequence;
select a first grabbing posture from the gripper sampling set based on the traversal sampling sequence; and
determine, using the collision representative objects, that the first grabbing posture does not incur collision.

9. The device of claim 8, wherein the second determination apparatus is further configured to:
determine a first approaching posture based on the first grabbing posture, wherein a degree-of-freedom pose of the gripper at a first approaching point is the same as a degree-of-freedom pose of the gripper at a first grabbing point, but the position of the first approaching point is different from that of the first grabbing point.

10. The device of claim 9, wherein the second determination apparatus is further configured to:

detect reachability of the first grabbing posture and the first approaching posture by way of inverse kinematics calculation; and check joint value continuity of the initial posture, the first approaching posture, and the first grabbing posture.

11. A nontransitory computer storage medium, wherein the medium comprises instructions configured such that, when the instructions are executed by the industrial robot, the industrial robot performs the grabbing method of claim 1.

* * * * *